UNITED STATES PATENT OFFICE.

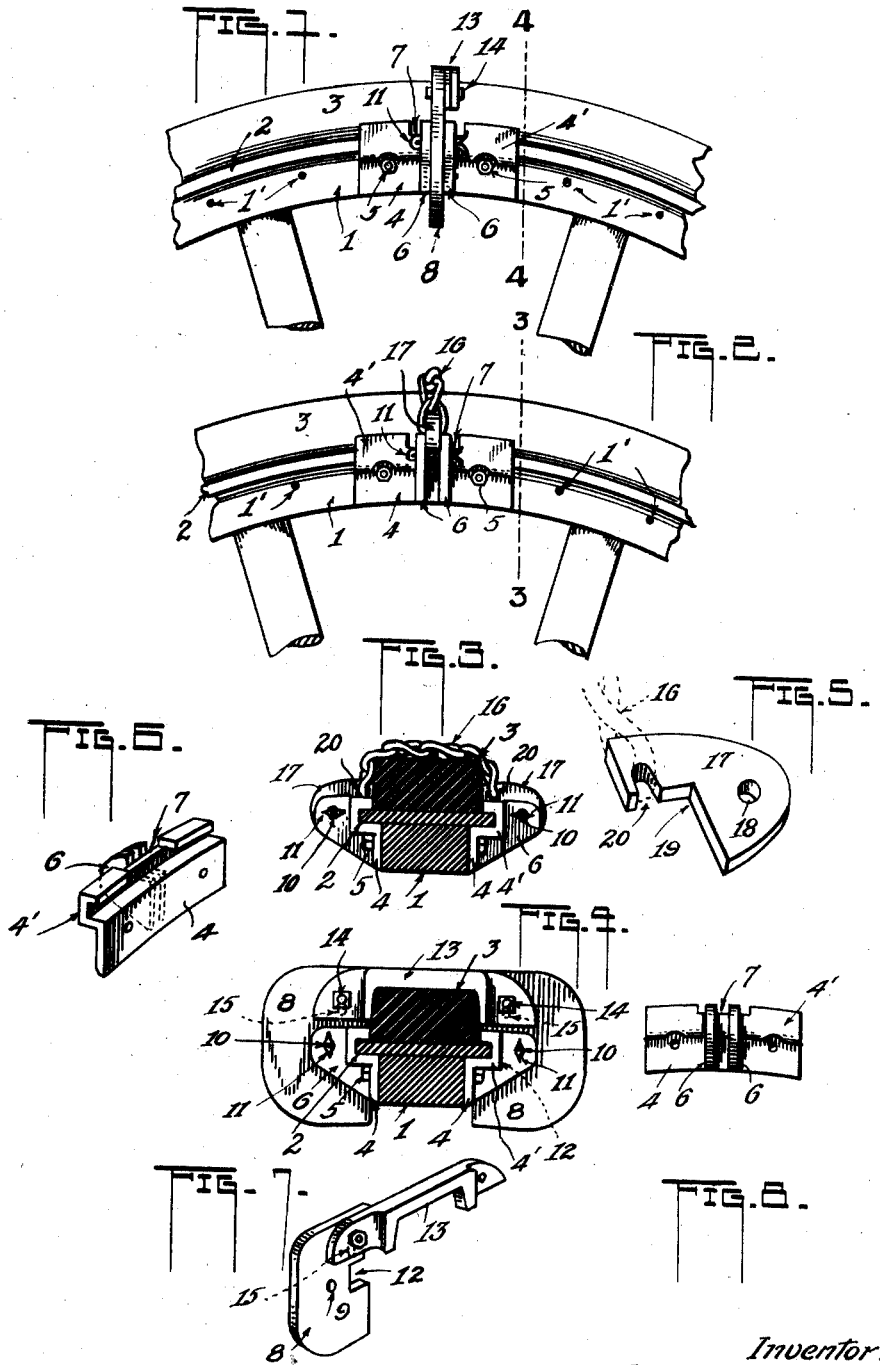
V. SCHILDWACHTER.
TRACTION LUG FOR VEHICLES.
APPLICATION FILED FEB. 17, 1919.
1,341,079.
Patented May 25, 1920.
Inventor:
Valentine Schildwachter,

VALENTINE SCHILDWACHTER, OF PEORIA, ILLINOIS.

TRACTION-LUG FOR VEHICLES.

1,341,079.   Specification of Letters Patent.   Patented May 25, 1920.

Application filed February 17, 1919. Serial No. 277,670.

*To all whom it may concern:*

Be it known that I, VALENTINE SCHILDWACHTER, a citizen of the United States, residing at Peoria, in the county of Peoria and State of Illinois, have invented certain new and useful Improvements in Traction-Lugs for Vehicles; and I do hereby declare that the following is a full, clear, and exact description of the invention, which will enable others skilled in the art to which it appertains to make and use the same.

This invention relates to improvements in lugs for the wheels of horseless vehicles. It relates more particularly to a member permanently secured to the felly of a wheel and to a lug which may be attached thereto or detached as required.

One of the objects of the invention is to provide an attachment for the wheels of a horseless vehicle of such form that the wheels may be given sufficient traction either for slippery road surfaces or for very muddy "heavy" roads.

Another object is to provide an attachment for a wheel that will accommodate one or more forms of lug whereby to obtain the required traction on any kind of road surface.

The invention besides the above, relates to certain novel details of construction in a device of the nature described, all of which will be pointed out in the following specification aided by the accompanying drawing in which;

Figure 1 is a side elevation of part of a wheel-felly and tire showing my invention in one of its forms applied thereto.

Fig. 2 is also a side elevation of part of a felly and tire showing another form of my invention applied thereto.

Fig. 3 is a transverse section of the felly and tire on line 3—3, Fig. 2, showing the form of invention of that figure.

Fig. 4 is a transverse section of the felly and tire shown in Fig. 1 and the form of my invention of that figure.

Fig. 5 shows in perspective a plate forming a part of my invention.

Fig. 6 illustrates in perspective one of a pair of members for permanent attachment to the felly showing its inner surface.

Fig. 7 shows in perspective certain parts shown in Figs. 1 and 4.

Fig. 8 is a side elevation of the member shown in Fig. 6 as it appears on its outer surface.

My invention includes means whereby ground engaging lugs may be attached to the wheels of a vehicle such as a heavy truck for instance, to meet any condition that may exist. It includes a part permanently secured to the felly of the wheel to receive either a road engaging device in the form of a chain, or a heavy rigid lug for use in deep mud or snow; but this will be better understood as the description proceeds.

1 indicates a portion of the felly of a wheel, 2 a metal rim lying upon the tread thereof, and 3 is the usual rubber tire suitably secured in position, all of which is common and well known by those familiar with the art, no claim being made thereto *per se.*

4, 4 indicate two members, preferably castings of steel, one at each side of the felly and placed opposite one another and secured by means of bolts 5, for example, that may extend through both the felly and the said members.

The latter are shaped at 4' to engage around the marginal edge of the rim 2 and grasp its outer surface. Each member is provided with a pair of spaced laterally extending lugs or ears 6 on its outer surface and, preferably, as clearly shown in Figs. 6 and 8 the member is cut away leaving a surface 7 substantially flush with the outer surface of the metal rim 2 as may be understood by reference to Figs. 1 and 2.

The pairs of members 4 described may be of any number, preferably six or eight, equally spaced around the felly. Between the pairs of ears 6 is placed a plate for holding a lug for providing the desired traction.

In Figs. 1, 4 and 7 is shown one form of lug adapted particularly for heavy muddy roads and deep snow.

8 indicates a plate of considerable area as compared with the area of cross section of the felly and tire. As shown, this plate when in position extends beyond the tread surface of the tire 3 and inward beyond the inner surface of the felly, Fig. 4, and it also extends well outward in a lateral direction from the tire and felly. Each plate is provided with a hole 9 corresponding in position with a hole 10 in each of the ears 6 for receiving a securing member such as a cotter pin 11, and a notch 12 is provided in the inner edge of each to receive the part 4' of the member 4 that incloses the metal rim 2.

By engaging around such part 4' the plate is enabled to take heavy pressure endwise as it bears upon the road surface and the cotter pin 11 is therefore in no danger of being sheared off as might otherwise result. And from the fact that the inner edges of the plates bear against the metal of the members 4 they will not rock or become loose.

13 is a "lug" adapted to lie across the tire 3, its ends being attached by bolts 14 to the described plates 8. This lug is recessed to receive into it the said tire.

Preferably the plates are slotted at 15 where the bolts 14 pass through so that the lug can have free play and follow down and rest upon the tire as that member wears away.

This form is peculiarly adapted for use on muddy roads where the tire will cut in very deeply, or in heavy deep snow. At such times a very large surface is desirable in order to take hold of the mass of material of the road. The ordinary so called anti-skid chains are not sufficient under such conditions since they do not prevent the wheels from spinning on the road surface when the power is applied thereto.

The plates 8 herein, and the lug 13 provide the desired traction, however, since the extremely long ground-engaging surface presented by them is very effective.

When a chain structure is sufficient or when the roads are nearer normal condition but slippery because of ice or mud I provide a short length of chain 16, Figs. 2 and 3 to overlie the tire.

As a holding means for said chain there is furnished a pair of plates 17, one being shown in Fig. 5, provided each with a hole 18 to register with the holes 10 of the ears 6. The plate has an angular recess 19 in one edge of the plate adapted to lie snugly against the outer surface of the part 4' of the said member 4, the other edge lying upon the surface 7 of the latter and upon the outer marginal portion of the metal rim 2 as shown.

20 is a notch in the outer portion of the plate to receive the end link of the said chain 16. The cotter pins 11 secure the plates in position between the ears holding the open portion of the notch closed upon the rim 2 so that the chain cannot become disengaged.

The cotter pins permit the quick removal or insertion of either type of lug according to the existing conditions of road surface.

Slight changes may be made throughout if desired since it is not my wish to be confined to what is described and shown. The plates 8 and the lug 13 are pivotally related so that the structure which they compose can be readily seated in position over the parts 4'. From the fact that the said plates 8 as well as the plates 17 have flat edges to bear against the outer surfaces of the members 4, but a single part such as the cotter pins 11, or other suitable members, is all that is required to hold the plates thoroughly rigid.

In order that the lugs 13 or 17 will not wear the tire in any one place I prefer to provide holes 1' at intervals around the felly so that, if desired, the plates 4 may be shifted from time to time.

Having thus described my invention I claim:

1. In combination with a wheel felly and its tire, a member permanently attached to the felly at each side, a separate plate for attachment to each member, and a rigid ground engaging device extending across the tire attached at its ends to the parts, said parts each having a slot, means carried by the device to engage in the slots, said device being free to move radially with respect to the parts.

2. In combination with a wheel felly and its tire, a member secured to the felly at each side, one lying opposite the other, each including a portion extending laterally therefrom, a plate adapted to be secured to each member and provided each with a notch to receive into it one of the said portions, means to secure the plates relatively to the members, and a single ground engaging device attached to both plates.

3. In combination with a wheel felly and its tire, a member secured to each side of the felly, a plate secured to each member, a connecting ground-engaging device, means for pivotally attaching it at its ends to the plates, there being radially extending slots in the plates for receiving said means.

4. In combination with a wheel-felly and its tire, a member secured permanently to each side of the felly, each including a laterally extending ear, and each also having a projection projecting laterally therefrom, a plate adapted to be secured to each member on its said ear and having a notch to receive into it the said projection, means to separately secure the plates to the members, and a ground engaging device connecting the plates and free to have radial movement with respect to the latter.

5. In combination with a wheel-felly and tire, a member secured at opposite sides of said felly, each including a pair of ears extending laterally therefrom and disposed radially, a plate lying between each pair of said ears, and a ground-engaging device to lie across the tire connecting said plates and free to move radially with respect to said plates, and means to connect the device at its ends to the plates, there being a slot in each plate to receive said means.

6. The combination with a wheel-felly and its tire, of a member secured at each side of said felly including an ear projecting laterally therefrom, a plate detachably held on each ear, each member also having a further projection extending laterally therefrom, there being a notch in each said plate to receive the last named projection into it, and a ground engaging device attached to and connecting the plates.

7. An attachment of the nature described for a wheel-felly, including in its construction a member adapted for attachment to each side of the felly, each having a laterally extending ear, and a plate secured to each ear, radially disposed, the members each having a projection thereon, each said plate having a notch to receive into it said projection.

In testimony whereof I affix my signature in presence of two witnesses.

VALENTINE SCHILDWACHTER.

Witnesses:
L. M. THURLOW,
Mrs. E. S. MAPLE.